(12) United States Patent
Makwinski

(10) Patent No.: US 8,610,313 B2
(45) Date of Patent: Dec. 17, 2013

(54) DC POWER OUTLETS IN FIXED POWER DISTRIBUTION SYSTEMS IN OR ON WALL INSTALLATIONS

(75) Inventor: Mark Makwinski, Cromwell, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 13/396,993

(22) Filed: Feb. 15, 2012

(65) Prior Publication Data

US 2012/0139745 A1 Jun. 7, 2012

Related U.S. Application Data

(63) Continuation of application No. 12/513,256, filed as application No. PCT/US2007/023575 on Nov. 8, 2007, now Pat. No. 8,134,254.

(60) Provisional application No. 60/858,130, filed on Nov. 9, 2006.

(51) Int. Cl.
*H01H 35/00* (2006.01)

(52) U.S. Cl.
USPC .......................................... 307/122

(58) Field of Classification Search
USPC ............... 710/16, 36; 320/103, 107; 713/300; 307/122
See application file for complete search history.

(56) References Cited

U.S. PATENT DOCUMENTS

| 5,563,782 | A  | * | 10/1996 | Chen et al. ..................... 363/146 |
| 6,981,887 | B1 |   | 1/2006  | Mese et al. |
| 7,504,931 | B2 | * | 3/2009  | Nguyen ..................... 340/426.36 |
| 2007/0029879 | A1 | * | 2/2007 | Eldredge ......................... 307/18 |
| 2008/0012423 | A1 | * | 1/2008 | Mimran ......................... 307/11 |

\* cited by examiner

*Primary Examiner* — Daniel Cavallari
(74) *Attorney, Agent, or Firm* — McCormick, Paulding & Huber LLP

(57) ABSTRACT

An electrical power distribution system has fixed stations with AC power to DC power conversion circuitry at these stations. The converter(s) are switchable ON/OFF at outlet ports or sockets where the socket configuration permits. Standardized DC sockets accommodate a variety of voltage requirements typical of portable digital devices. In some embodiments feedback circuitry is provided to regulate the power to these devices in accordance with parameters programmed in the portable devices or in the sensing circuitry provided at each station.

5 Claims, 9 Drawing Sheets

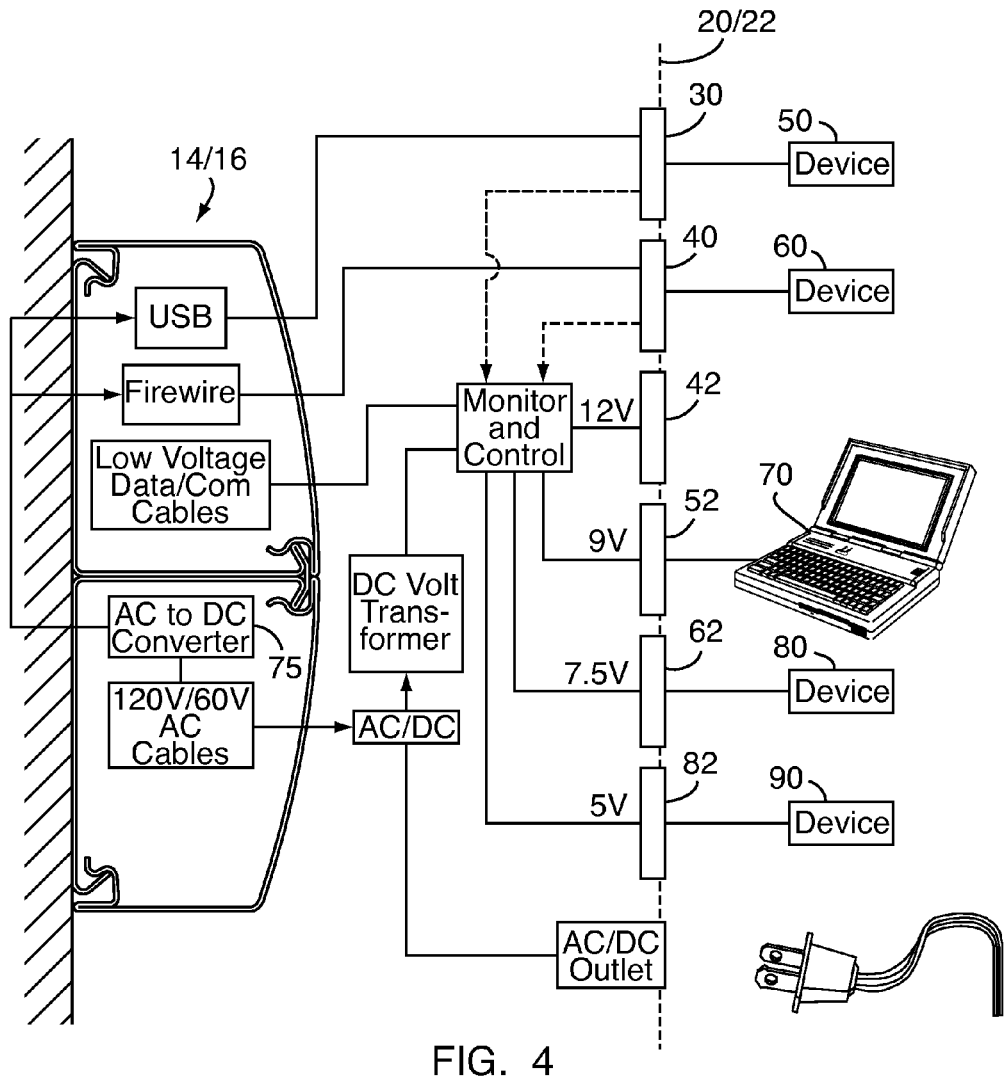
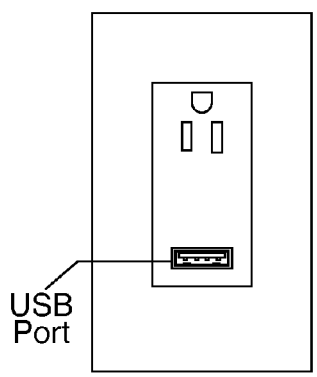
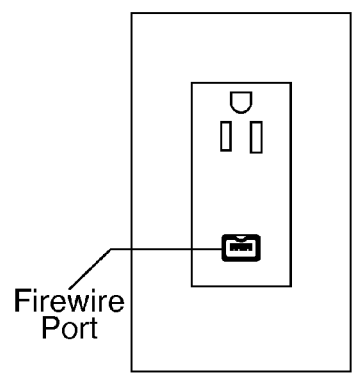
FIG. 4
FIG. 5
FIG. 6

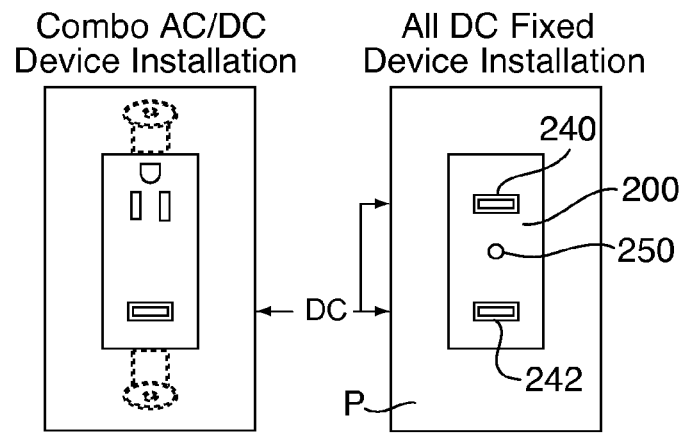
FIG. 7
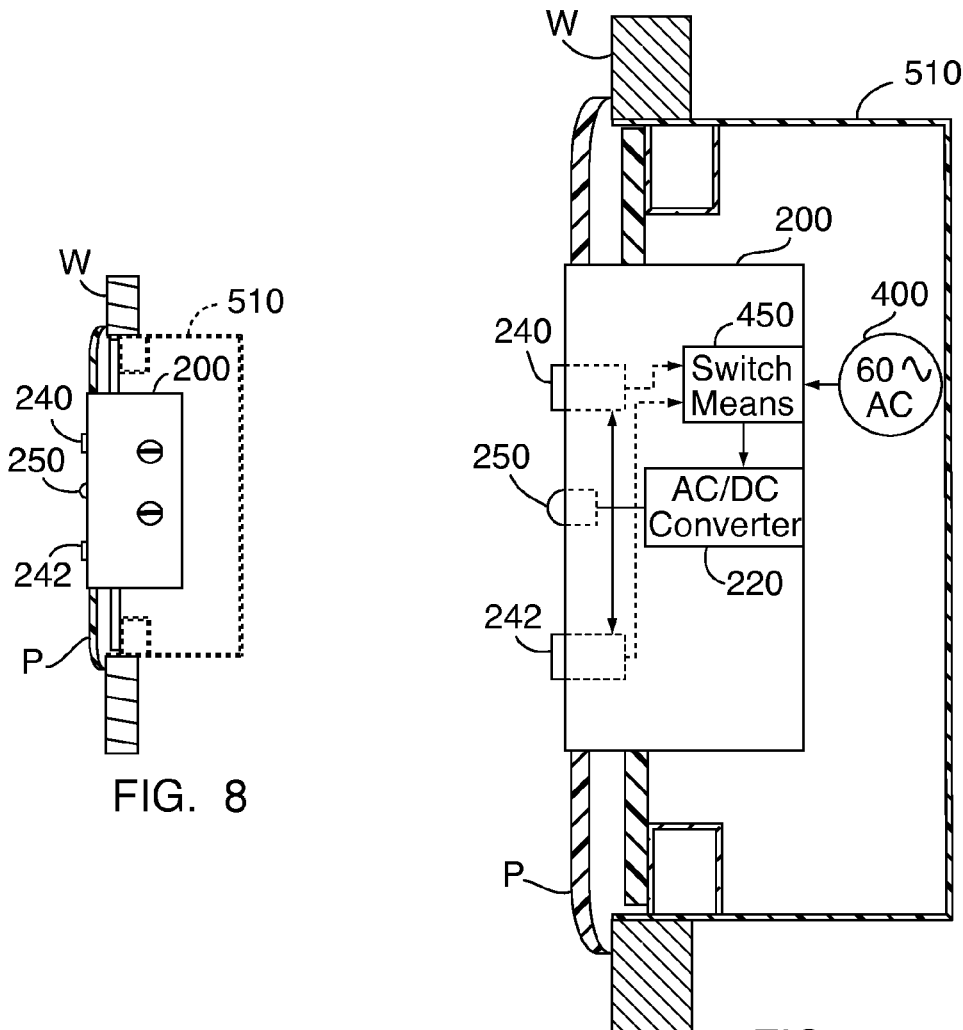
FIG. 8
FIG. 9

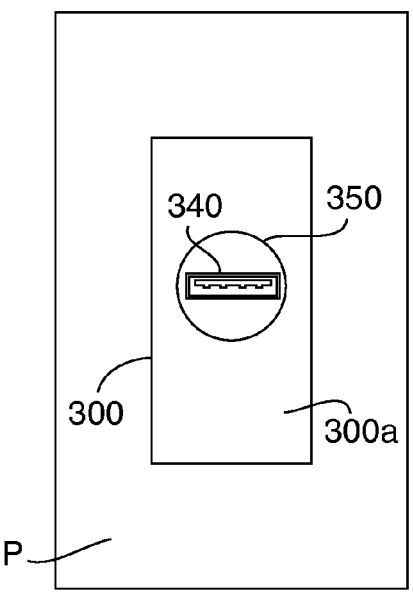
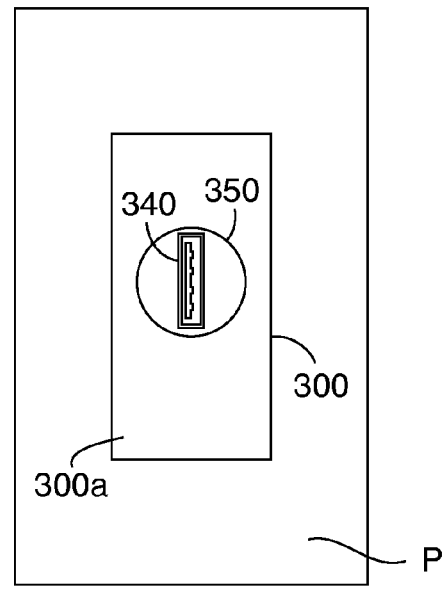
FIG. 10     FIG. 11
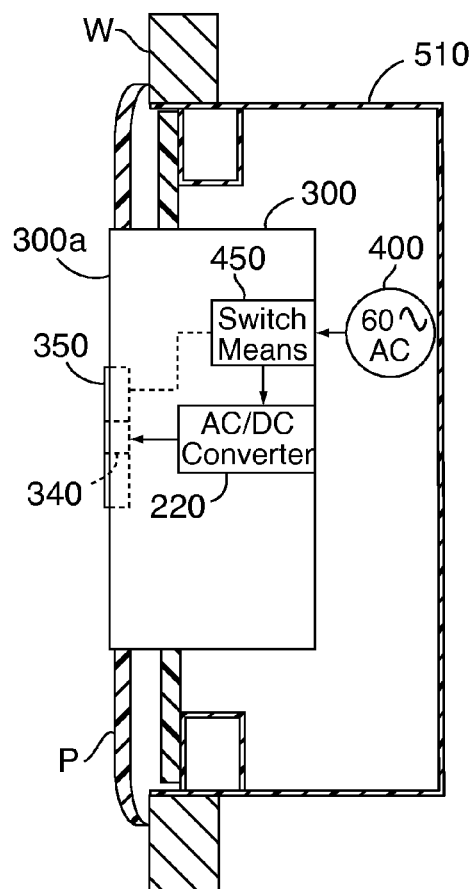
FIG. 12

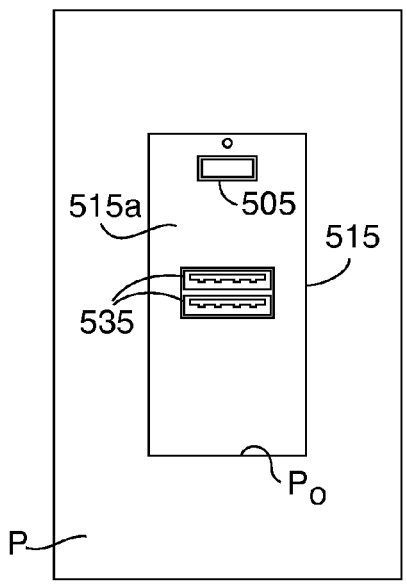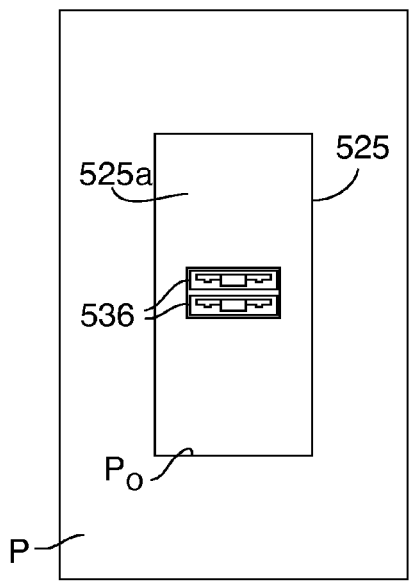
FIG. 16     FIG. 17
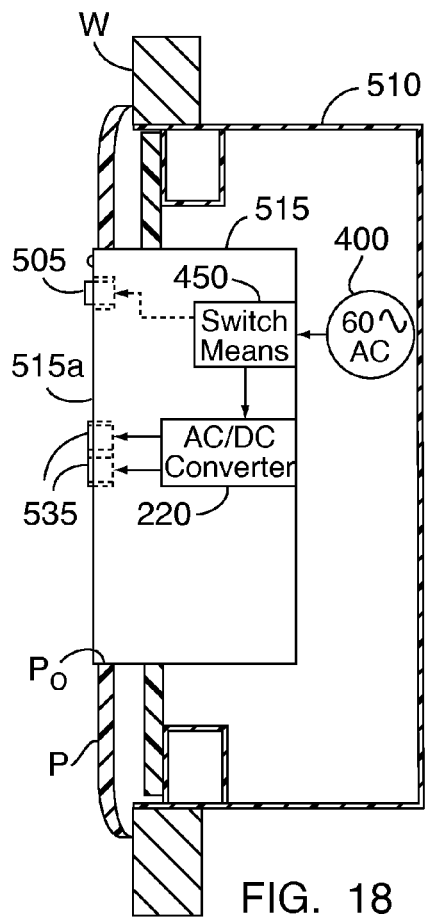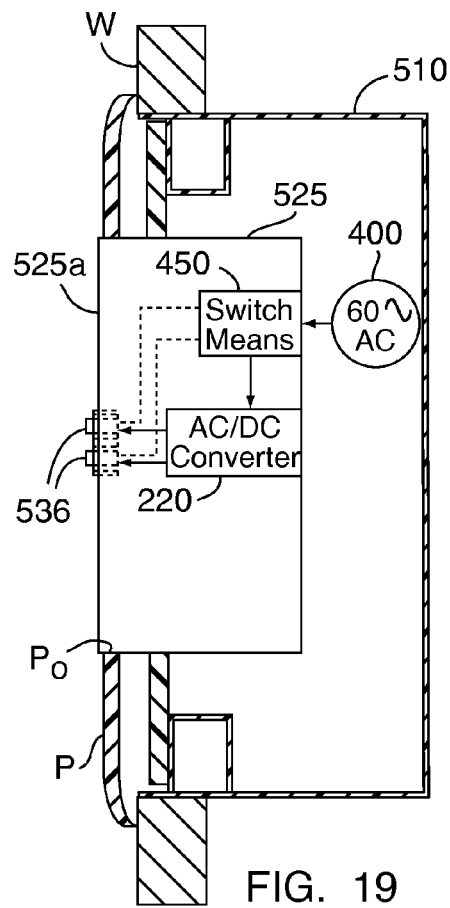
FIG. 18     FIG. 19

DC POWER OUTLETS IN FIXED POWER DISTRIBUTION SYSTEMS IN OR ON WALL INSTALLATIONS

CROSS REFERENCE TO RELATED APPLICATIONS

This application is a continuation of prior U.S. patent application Ser. No. 12/513,256, filed on May 1, 2009, now U.S. Patent Application Publication No. 2010/0090528, which is the National Stage filing of PCT Application No. PCT/US2007/023575, filed on Nov. 8, 2007, which claims priority to U.S. Provisional Patent Application No. 60/858,130 filed on Nov. 9, 2006.

BACKGROUND

The number of and voltage requirements for the wide variety of portable electrical devices has multiplied, along with the ongoing need to recharge such devices. For example, cell phones, personal digital assistant devices, laptop computers, MP3 players, digital cameras, and other devices all need to be charged. Each device generally has its peculiar charge plug configuration and "brick", or specially adapted power supply for charging in the home or office.

Furthermore, many of these portable devices are capable of processing data and being linked to networks through connectors such as the universal serial bus (USB) and/or FIREWIRE (IEEE 1394) style connectors, which connectors are now used for charging devices such as cameras and cell phones, etc.

A need exists, therefore, for a more convenient fixed station in the home or office environment which can be utilized for charging such portable electrical devices, without requiring specially matched adaptive power supplies or "bricks".

SUMMARY

The present invention seeks to obviate the need for such a multitude of especially adapted power supplies, or "bricks" for the charging of a variety of portable electrical devices operating from the wide range of different DC battery voltages such as are now required for these portable devices. A permanent charging station is disclosed, where a variety of portable devices can be operated and/or re-energized in a home or office environment.

More particularly, and in a preferred embodiment of the present invention, the building structure is provided with a permanently installed electrical power and data/communication distribution system, preferably in the form of a wall mounted electrical raceway of the type manufactured by The Wiremold Company of West Hartford, Conn.

In such raceway installations AC power cables are connected to a source of AC power and adapted for use at predetermined stations along the raceway by providing AC electrical outlets therein. So too, data/communication outlets of the telephone jack type are commonly provided, as are outlets of the type used for various data, and audio/visual installations.

The present invention carries these "jack" configurations one step further, and provides DC sockets in a variety of forms. In one aspect of this disclosure, USB and FIREWIRE style data exchange outlet ports are provided at a single location or station in the electrical distribution system in an office building, factory, or home environment. In a preferred aspect these USB and/or FIREWIRE ports are provided, without using their data lines/connectors, and derive DC power from the AC power source. No data/communication connections are required, nor are such cables required.

Such a fixed station may be integrated with a wall mounted raceway or comprise a conventional wall receptacle. The fixed station may or may not include an enclosure having an accessible panel. The enclosure or wall receptacle defines an interior space in which both electrical AC and DC connections can be provided to the AC electrical power conductors in the raceway. DC rectifying circuitry provides a variety of DC voltages. Power connections to a USB or FIREWIRE port are energized from the source of AC power through a converter suitable for USB or FIREWIRE DC voltage outputs. Portable electrical devices, having a USB port, are used at present for powering various peripherals in a computer system having USB compatibility. Cell phones and personal digital assistants, or "PDA's", are also capable of being operated, or charged from a USB, or FIREWIRE port. Preferably, the data connections for these USB and FIREWIRE outlets are not activated and do not communicate with any computer network in a preferred form of the present invention.

In its preferred form, the present invention comprises a switchable source of DC power, suitable for selectively energizing a USB port for example, in a building's electrical power distribution system. Rather than running DC voltage cables in a divided raceway of the type having AC power in one wireway, and having low voltage DC cables in a separate wireway, the AC electrical power, throughout the building structure is rectified and converted to the desired DC power at each fixed station having the outlets for receiving the devices to be charged or powered.

Whether in a conventional electrical distribution system within a wall receptacle, or in a raceway, the invention includes outlet plates provided at selected locations throughout the building, serviced by a source of AC power. The present invention requires only power to the DC voltage lines for a USB port, the data lines being inactive.

In accordance with the present invention, a DC outlet plug or USB port is provided in an outlet plate, and electrical switching means is coupled between the DC outlet plug and the AC power cable to selectively energize that DC outlet plug.

In one embodiment of the present invention, DC outlet ports are provided for access to voltages selected from a range of common DC voltages including but not limited to, 12 volts, 9 volts, 7½ volts, 5 volts, etc. DC sockets are provided in an array on a panel, which may be provided as a structural component of an enclosure fitted into a divided two piece conventional raceway of the type used for electrical power distribution cables and data/communication cables in a building structure.

In another embodiment of the present invention the AC voltage cables are connected to an AC to DC voltage converter which transforms the power at fixed stations in the building structure. Feedback circuitry may be provided for coupling the appropriate electrical DC voltages to the devices to be powered or charged. A data feedback loop is provided through conventional USB and FIREWIRE ports in the panel to not only provide the appropriate charging voltage at these USB and FIREWIRE outlet ports, but to monitor the voltage provided to a battery in a portable device connected to these "intelligent" USB and FIREWIRE ports. In order to maintain appropriate voltage to that battery, the voltage is provided above whatever low voltage shut off level is built into the portable devices itself. I refer to prior art U.S. Pat. No. 7,034,503 issued Apr. 25, 2006 and entitled Circuit and Method of Operation for an Adaptive Charge Rate Power Supply, for a more complete disclosure of one possible configuration for this monitoring circuitry. That U.S. Pat. No. 7,034,503 is incorporated by reference along with other patents listed in my provisional application identified in the opening paragraph of this disclosure.

With particular reference to the prior art patents listed in my provisional application, U.S. Pat. No. 6,976,885 is particularly instructive, and discloses a protocol for DC plug configurations that teaches "tips" for a "charging" or power cord that preclude applying an over voltage to the portable electrical devices to be charged or operated.

BRIEF DESCRIPTION OF THE DRAWINGS

FIG. 4 is a schematic view to illustrate a version of the invention incorporating a feed back feature wherein a USB and a FIREWIRE outlet port is/are included in a panel of the type shown in FIGS. 1 through 3 inclusively, for not only charging devices equipped with these USB and FIREWIRE style ports, but also including monitoring and feedback functions.

FIGS. 5 and 6 show examples of a combination AC and DC outlet devices such as are contemplated in the present disclosure.

FIG. 7 shows single wall box receptacles, the left hand view having both AC and DC sockets the right hand view showing duplex USB style sockets. An indicator light shows whether these sockets are energized.

FIG. 8 is a side elevational view of FIG. 7.

FIG. 9 is a schematic view of the FIGS. 7 and 8 duplex DC device.

FIGS. 10 and 11 show a single DC outlet device in which the USB socket is rotatable to switch the DC power ON or OFF as a result of inserting a USB plug (not shown) and twisting the plug and socket from horizontal to vertical.

FIG. 12 is a schematic view of the FIGS. 10 and 11 duplex socket showing the internal components.

FIG. 16 shows a duplex DC outlet socket device provided with a separate manual switch for selectively energizing these sockets.

FIG. 17 is similar to FIG. 16 but the manual switch is replaced by a push type switch in a DC duplex socket structure similar to that shown in FIGS. 13-15.

FIG. 18 shows schematically the operation of the FIG. 16. outlet socket.

FIG. 19 shows schematically the operation of the FIG. 17 outlet sockets.

DETAILED DESCRIPTION OF DRAWINGS
FIGS. 1-6

Figure 1:
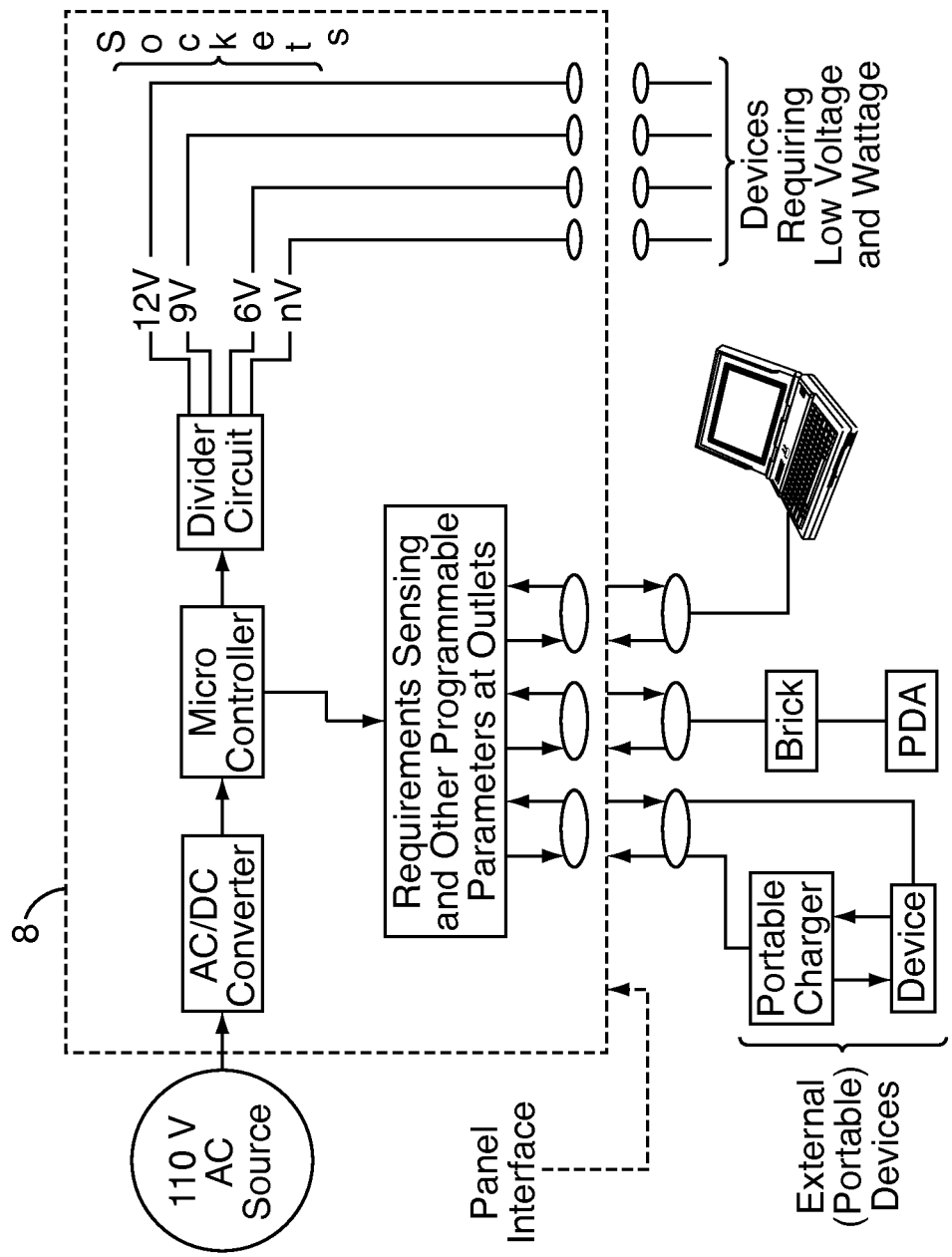
FIG. 1 shows, in schematic fashion, representative portable devices which can be charged from the outlet ports provided at a station in the building structure constructed in accordance with the present invention.

Turning now to FIG. 1 of the drawings is greater detail, this embodiment shows schematically the electrical power distribution system for a building structure, represented by the 110 volt source of AC power connected to a station 8 in the building structure. This station 8 has internal electrical components, namely AC to DC converting means for feeding a number of DC sockets of varying DC voltage at an interface or panel where a variety of DC voltages are available to charge individual devices, or to power them.

Also shown in FIG. 1 are control circuit components that provide feedback signals from the devices to be charged to regulate output power requirements to the devices to be powered or charged.

Figure 2:
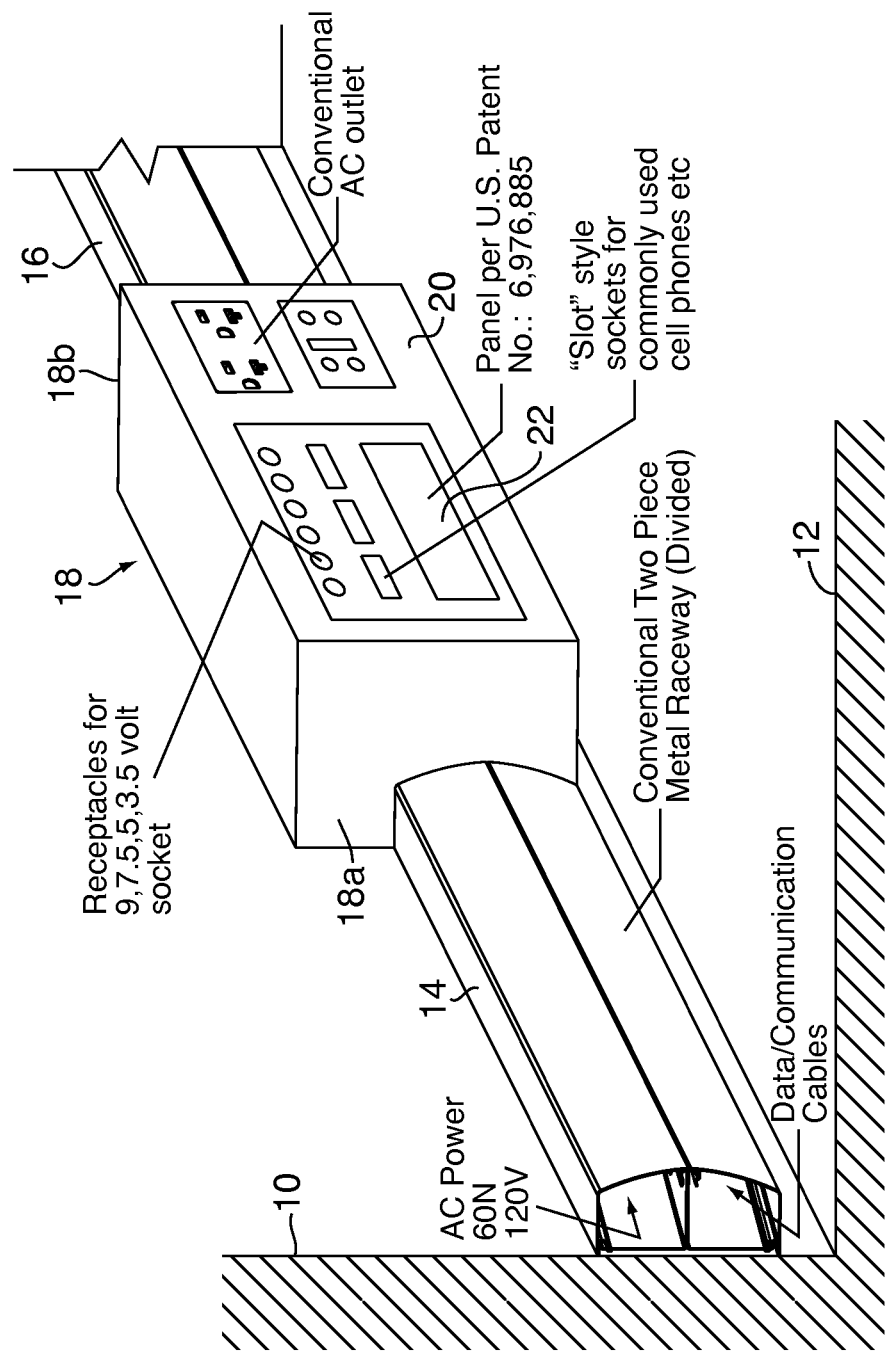
FIG. 2 is a perspective view illustrating a conventional two piece divided metal raceway having data/communication cables in one of the two separated wireways, and also having AC electrical power cables in the other of said divided wireways. The enclosure illustrated is somewhat schematic but illustrates the variety of DC outlet ports which can be accommodated at a fixed station in an electrical power distribution system of a typical building.

FIG. 2 shows a building structure represented by the wall 10 and floor 12, with two raceway sections 14 and 16 provided on the wall 10. A fixed charging station 18 is provided between these raceway sections.

The charging station 18 is more particularly defined by an enclosure that communicates with the wireways within the raceway sections. AC power cables run through access openings (not shown) provided for this purpose in the end walls 18a and 18b of the enclosure 18.

The front panel 20 of the enclosure 18 is provided with receptacles for 9, 7, 5, and 3.5 volt charging cords (not shown) associated with a variety of portable electrical devices to be charged. Slot style sockets are also included for the more commonly used cell phones, and a sub-panel is also provided as shown at 22 for the proprietary tips from U.S. Pat. No. 6,976,885.

Turning next to the schematic illustration of the structure shown in FIG. 1, the enclosure 18, and more particularly the panel 20, is represented by the interface between the enclosure and the raceway, as indicated at the left hand side of this view. AC cables are schematically illustrated in this view as well, being connected to those within the raceway as described previously, or to the AC source within the building's structure itself.

Figure 3:
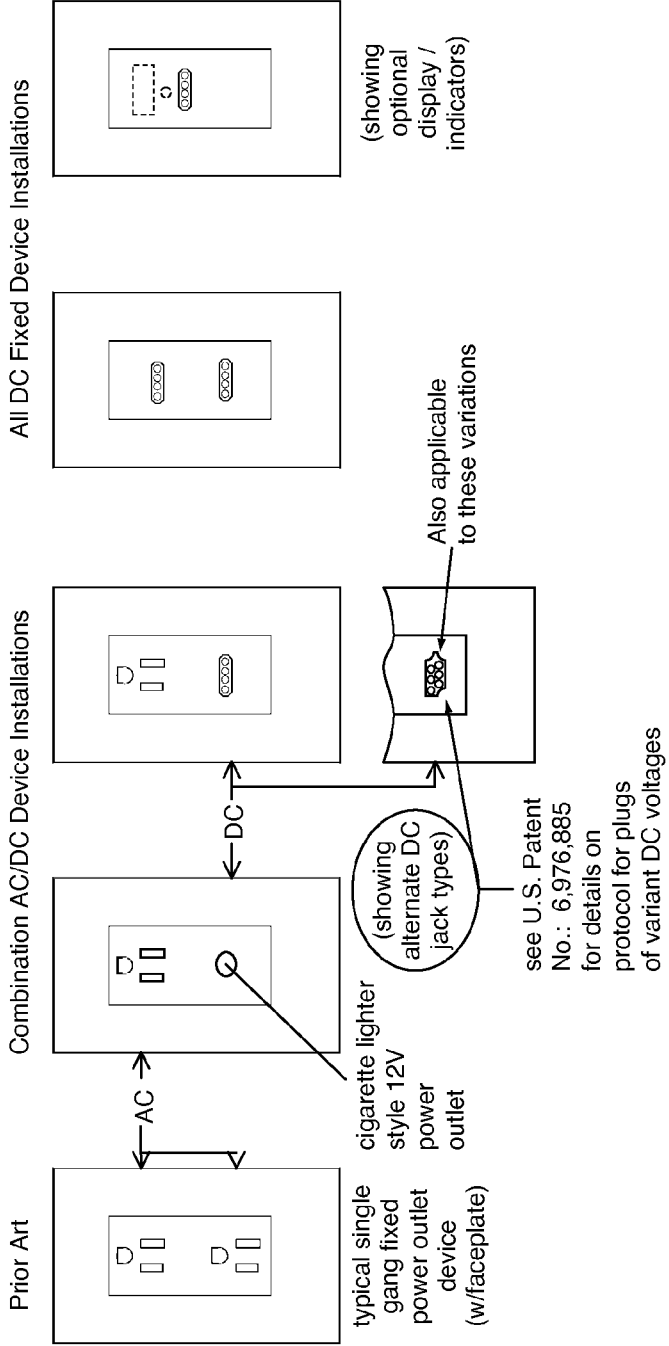
FIG. 3 illustrates a variety of outlet ports which might be provided in a typical face plate, in addition to the prior art single gang duplex power outlet face plate shown at the left side in this view.

FIG. 3 shows devices plates of the type presently available, with a typical duplex 110 volt grounded AC outlet at the left hand side of this view. Combinations of such an outlet plug configuration with several DC voltage outlet configurations, including those from U.S. Pat. No. 6,976,885 are also illustrated. This view also illustrates a typical raceway installation having a typical AC outlet device provided therein, and also including a slotted DC charging outlet in a combination device.

FIG. 4 shows the same general configuration as that of FIG. 1, but also included is feedback or monitoring circuitry. USB or FIREWIRE ports, illustrated respectively at 30 and 40 on the panel 20, might have application for this feedback function. The panel interface 20/22 is shown schematically by the broken line in the middle of this view. The raceway 14/16 is also shown schematically in this view as are the power cables provided in the lower wireway and the low voltage DC cables provided in the upper wireway.

FIG. 4 also illustrates internally mounted AC to DC conversion means 75 for USB and FIREWIRE ports 30, 40 in the panel 20. While cables can be connected respectively to each of the ports 30 and 40 in the panel 20 this converter avoids the need for a daisy chain approach to powering these USB and FIREWIRE ports. In addition to the electrical DC voltage connection, the data lines from these USB and FIREWIRE ports may also be utilized as inputs to conventional controller circuitry, which transforms and regulates as well as rectifies the output voltage for purposes of providing a variety of voltages to the DC outlet ports as indicated in this view. U.S. Pat. No. 6,995,963 is incorporated by reference and discloses a DC power management circuit for a FIREWIRE port.

FIG. 4 also shows a typical peripheral device 50 such as might accommodate a USB cable, as well as a device 60 such as might accommodate a FIREWIRE cable. These devices 50 and 60 may be one and the same, or selected from the many peripheral devices available today. These DC ports may be duplicated in the portable devices for accommodating more than one such device in a multiplexed system. See for example, U.S. Pat. No. 6,614,206 issued Sep. 2, 2003 and entitled UNIVERSAL USB CHARGING ACCESSORY. The FIREWIRE protocol is embodied in IEEE specification No. 1394, which disclosure is incorporated by reference herein.

The device 70 illustrated in FIG. 4 is a lap top computer, and designed to be charged from an automotive type cigarette lighter socket as illustrated generally at 42. The devices indicated generally at 80 and 90 represent smaller portable devices such as might require charging "bricks" 62,82 or specially adapted power supplies designed solely for use with such devices. The present disclosure seeks to obviate the need for the user to carry with him in addition to the portable device a charging "brick" or power supply designed specifically for that device.

FIG. 5 shows a wall mounted, or raceway mounted outlet plate having two power outlets, an AC outlet for 120 v, 60 cycle power, and a USB port for 5 v DC power.

FIG. 6 shows a wall or raceway mounted outlet plate having two power outlets, an AC outlet as in FIG. 5. Plus a FIREWIRE port, which can provide DC voltages from 7.5 volts up to 4 or 5 times 7.5 volts.

DETAILED DESCRIPTION OF FIGS. 7-22

In the embodiment to be described with reference to FIGS. 7-22 the DC outlet ports are provided in an outlet device of conventional external size and shape, suitable for mounting in a conventional wall receptacle, or raceway device holder/plate. Preferably, the DC outlet ports are in the form of USB or FIREWIRE ports. Switching means is provided for selectively energizing these ports or sockets when they are used for powering or for charging electrical devices. These ports or outlets are not for use to exchange data signals. The data lines are not connected in these USB and FIREWIRE sockets of FIGS. 7-22.

Conventionally, USB wall plates have been proposed for a variety of purposes. Generally such USB ports or sockets are mounted in computer equipment or peripheral devices used with computer equipment.

The convenience of USB compliant outlet ports has been carried over to standard wall plates of the type used with receptacles provided in a wall structure. See for example U.S. Pat. No. 6,943,296 issued Sep. 13, 2005 to BellSouth. This '296 patent discloses a USB wall plate having circuitry that allows live USB ports to be placed throughout a building structure. This '296 patent relies upon electrical power to daisy chain USB ports so as to allow use of these ports not only for low voltage DC power purposes, but also for data transmission.

The present invention foregoes the need for utilizing these data conductors in a typical USB port, and instead provides only the DC voltage in each of the USB ports. This distinction is important because the five volt DC output from a USB outlet port can of course be used to charge portable electrical devices.

Due to electrical losses in the length of USB cabling required to wire a typical building structure, boosting of the DC voltage to the "design" five volts for USB cabling is generally required. The above '296 patent is incorporated by reference as illustrative of one such boosting arrangement. The present invention obviates this need for boosting DC voltages at such USB ports.

In further accordance with the present invention, switching means is provided at each of the USB outlet plates so as to avoid any requirement for boosting the DC voltage, when a portable device is to be charged. As a result of switching the USB port from its "off" condition to its "on" condition, and transforming and rectifying the AC voltage to DC voltage, each station has ready access to converted DC voltage in a very efficient way.

FIG. 7 shows two possible configurations for installing a USB port in a conventional wall box receptacle 50. In the left hand view the USB port is simply provided in the same device as an AC outlet. In the right hand view two USB ports are provided in a duplex DC device that also has an LED lamp to indicate when these USB ports are energized.

FIG. 8 shows the socket in the right hand view of FIG. 7 in greater detail, with connections for a 110 volt AC power cable (not shown). FIG. 9 shows the FIG. 8 structure in schematic form to illustrate the 110 volt 60 cycle AC power 400 being switchable to selectively energize a converter (AC/DC) 220. The two USB ports are mounted in the device 200 for limited translational or inward sliding motion, for alternatively switching input AC power, through switch means 450, to the converter 220. Thus, insertion of a USB plug (not shown) into a USB socket or slot 240/242, switches the converter ON. Withdrawal and pushing plug in again will reverse the switch causing the converter to be deenergized. The LED or lamp 250 will provide visual indication if the converter condition is ON/OFF.

FIGS. 10-12 show a similar set up for a single USB socket, but instead of being pushed in to switch the DC output of the converter 220 ON/OFF, this USB port 340 can be rotated through 90° from the FIG. 10 to the FIG. 11 position to switch the converter ON/OFF. A rotatable collar 350 houses the USB port in the device 300 front face 300a for this purpose.

Figure 13:
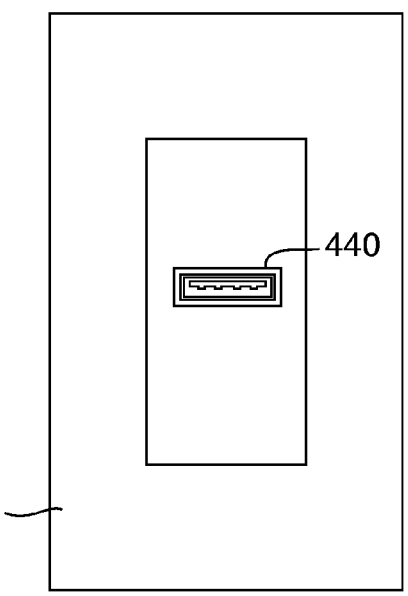
FIG. 13 shows a single DC outlet device in which the USB socket is switched in response to inserting a USB plug.
Figure 14:
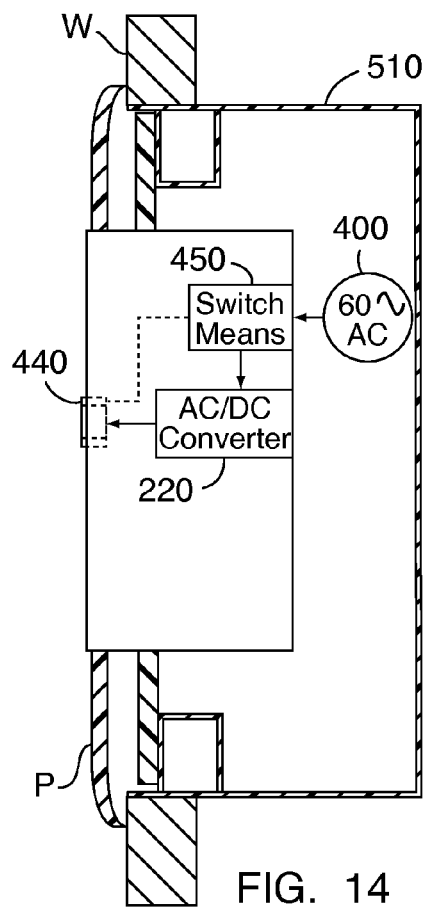
FIGS. 14 and 15 show schematically how the USB socket functions as a "push" switch to selectively energize the socket.
Figure 15:
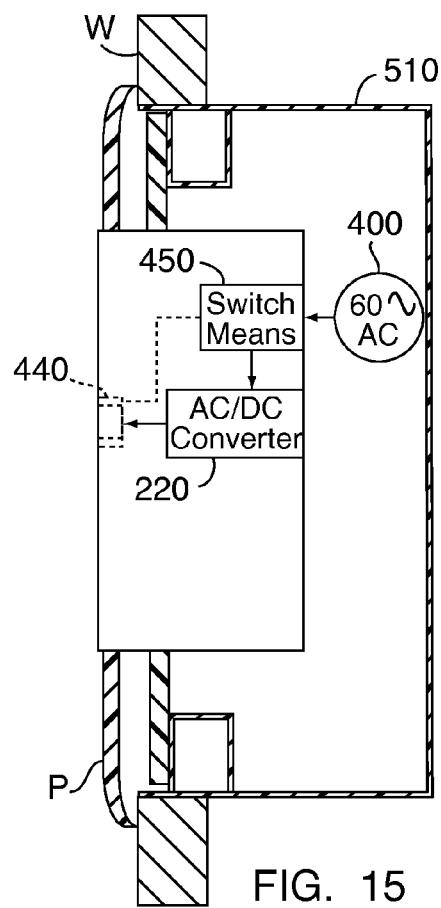

FIGS. 13-15 shows another switching arrangement wherein the USB port 440 is pushed inwardly to electrically switch AC power 400 to the AC/DC converter 220 as described above with reference to FIGS. 7, 8 and 9.

This and other switching means are also feasible for use in switching other DC outlet ports ON/OFF. For example, the well known FIREWIRE port developed by Apple Computer, Inc. and adopted by the IEEE is another useful socket that is well suited to adoption for use in accordance with the present invention.

Additional variations are described below, and are also well suited for use with other standard cables capable of carrying the voltages commonly used in portable electrical devices such as digital cameras, personal digital assistants, and cell phones, to name a few popular products of the type contemplated for use with DC outlets at fixed building power stations in a building's electrical power distribution system.

FIGS. 16 and 18 show a wall W mounted electrical box/receptacle 510 with a device 515 provided in the box and a wall plate P surrounding the device face 515a so that the face of the device resides in the plate opening Po.

The device 515 has a pair of DC sockets 535 of the USB type, mounted in the device face and a manual switch 505 for selectively connecting these USB ports to the output of an AC/DC converter 220 described previously. The building's electrical system is conventionally connected to the device 515 as shown at 400.

FIGS. 17 and 19 show a similar structure but instead of a manual switch, the USB ports are mounted slidably in the face 525a of the device 525 and act as push button switches for the switching means 450 to selectively connect the output of the AC/DC converter 220 to the power conductors of a USB cable (not shown) when a cable end is pushed into one or both sockets 536. Removal of the cable (not shown) causes the switching means 450 to deenergize these USB ports 536, saving electricity otherwise delivered to the AC/DC converter 220 continuously, but for this switching feature.

Figure 20:
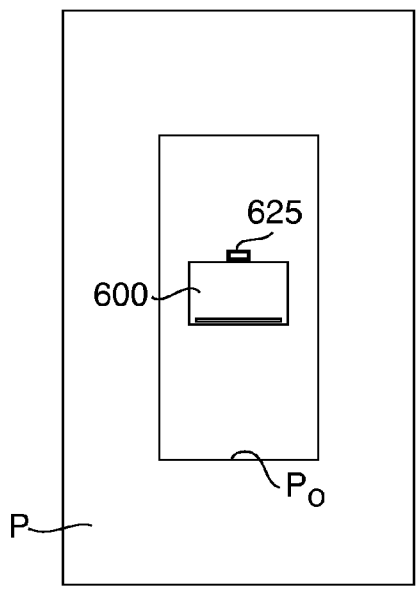
FIG. 20 shows a duplex DC socket with a cover plate normally enclosing these sockets.
Figure 21:
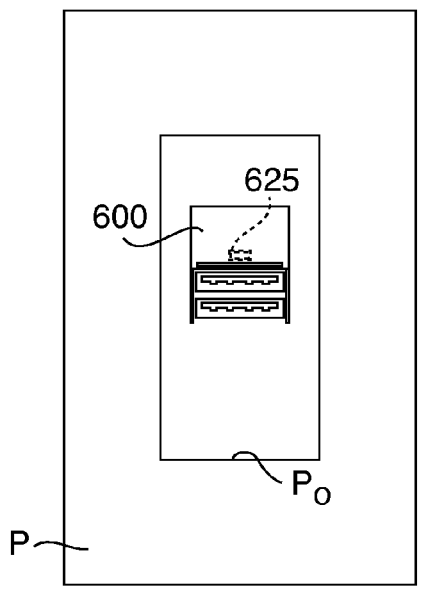
FIG. 21 shows the FIG. 20 socket with the cover plate raised to expose the USB sockets.
Figure 22:
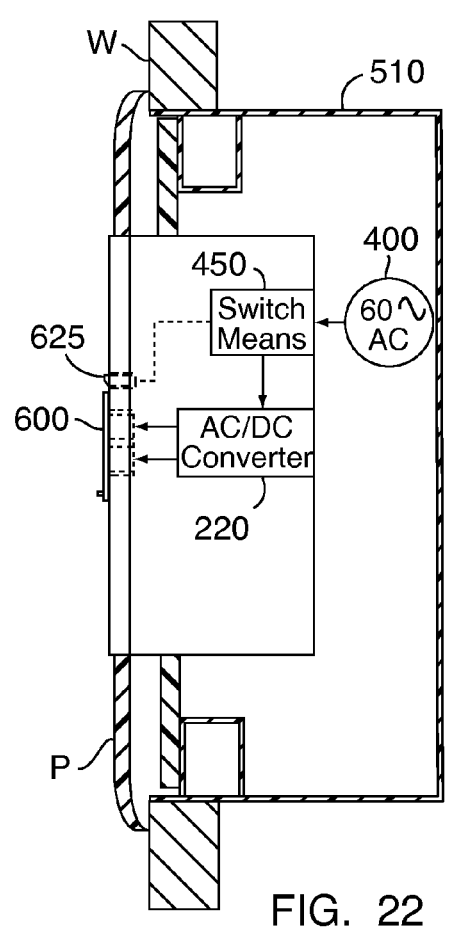
FIG. 22 shows schematically how the movable cover in FIGS. 20 and 21 operates the AC to DC converter to energize the duplex DC socket in this version of my invention.

FIGS. 20-22 show a gated USB duplex port setup with the switching function achieved by vertical movement of a gate or cover 600. This structure results in a safety feature since the DC outlet ports cannot be accessed except by raising this gate or cover. The USB cable itself serves to hold the gate or cover open/up so that removal of the cable causes the gate to close and a switch actuator to open the switching means 450 deactivating the AC to DC converter 220.

Although FIGS. 10-22 do not all show a lamp or LED indicator means such as that in FIGS. 7, 8 and 9, it is apparent that this feature can be embodied in the switchable USB outlet devices of FIGS. 10-22.

In summary, the invention can be practiced in a variety of forms, some of which are specifically disclosed by way of example. It is, therefore, to be understood that the appended claims define the scope of the invention, and the embodiments described above are by way of examples to illustrate how the claimed invention might be carried out in practice.

The invention claimed is:

1. An electrical power distribution system, comprising:
    an AC to DC converter for providing low voltage DC power;
    at least one USB port electrically coupled to said AC to DC converter by a voltage regulator, wherein said USB port is configured to provide a DC voltage line connection but not a data line connection; and
    a switch coupled between said AC to DC converter and said USB port to selectively energize said USB port when a plug is inserted, the switch including a rotatable collar housing the USB port;
    wherein said switch is configured to turn the AC to DC converter on when a plug is inserted into said USB port, and turn the AC to DC converter off when no plug is inserted into said USB port; and
    wherein the switch turns on the AC to DC converter when the USB port is rotated from a first position to a second position and turns off the AC to DC converter when the USB port is rotated from the second position to the first position.

2. The system according to claim 1, further including an indicator activated electrically by said switch for visually indicating the electrical condition of said USB port.

3. The system according to claim 2, wherein the indicator is an LED indicator.

4. The system according to claim 1, wherein said switch comprises a moveable support, whereby inserting a plug into said USB port energizes said AC to DC converter and provides DC voltage to the USB port.

5. The system according to claim 1, wherein said USB port is configured to provide various DC voltages for powering devices having various voltage requirements.

* * * * *